UNITED STATES PATENT OFFICE.

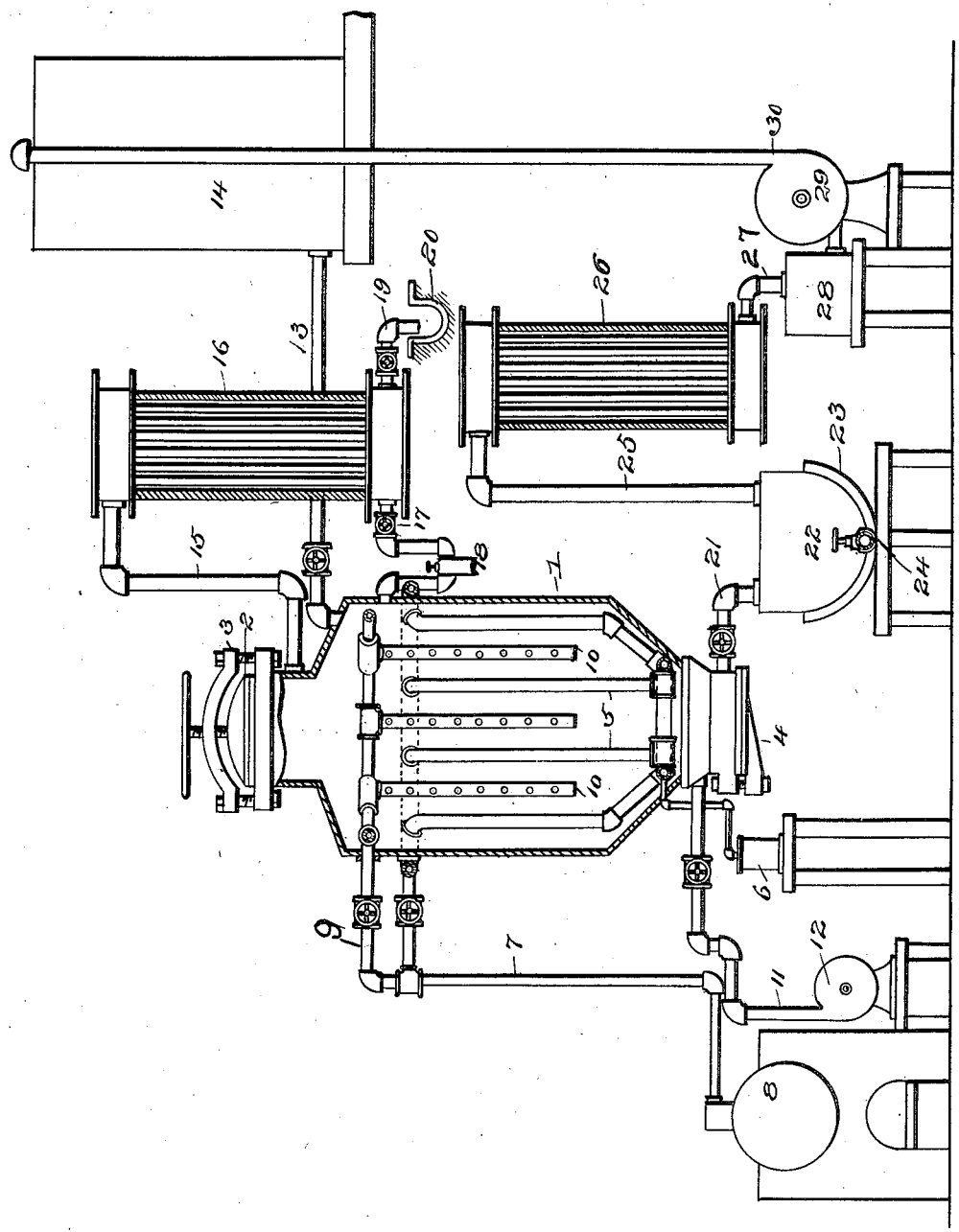

GEORGE WALKER, OF NEW YORK, N. Y., ASSIGNOR TO HOMER T. YARYAN, OF TOLEDO, OHIO.

PROCESS OF EXTRACTING RESIN AND TURPENTINE.

No. 922,369.　　　　Specification of Letters Patent.　　Patented May 18, 1909.

Application filed May 9, 1908. Serial No. 431,757.

*To all whom it may concern:*

Be it known that I, GEORGE WALKER, a citizen of the United States, residing at New York, in the county and State of New York, have invented certain new and useful Improvements in Processes of Extracting Resin and Turpentine, whereof the following is a specification.

This invention relates to processes of extracting resin and turpentine; and comprises a method of extracting turpentine and resin from coniferous woods in which such wood is first freed from turpentine, volatile terpenes, etc., by distillation under conditions injurious neither to the turpentine nor the resin and is subsequently extracted with a volatile solvent body to obtain a pure resin; all as more fully hereinafter set forth and as claimed.

In the prior art, coniferous wood has been directly extracted with various solvents, hydrocarbons being generally employed, to obtain rosin and turpentine at one operation. The extract obtained contains both bodies, together with the solvent employed, and is distilled to remove, first the solvent and then the turpentine, the rosin being left behind in the still as a residue. This method however suffers from a number of disadvantages and does not give rosin and turpentine of good commercial grades. The turpentine is generally ill-smelling, partly because of bodies derived from the solvent employed, and partly, no doubt, because of the presence of wood constituents or products other than turpentine, while the rosin generally suffers in clearness, color and quality by the repeated distillations necessary to free it of the solvent employed and of turpentine, a high temperature being usually employed in such distillations. Rosin does not well withstand long continuance of high temperatures. Since even volatile commercial hydrocarbons like gasolene and naphtha, contain high-boiling impurities such impurities tend to contaminate the turpentine.

In the present process I have devised a simple, cheap and ready method of preparing a pure rosin and turpentine of good commercial grades, this method obviating the stated disadvantages and securing certain new advantages. According to this invention, I preliminarily treat the wood, which may be any of the coniferous woods, by a distillation at comparatively low temperatures, that is, temperatures at which neither the woody fiber nor the resin will suffer pyrolytic decomposition or injurious changes and afford decomposition products to contaminate the distillation product. This distillation gives me turpentine, leaving the rosin in the wood unchanged. While the distillation may be effected by simple heating of the comminuted wood in thin layers, or strata, since wood contains considerable water which in evaporating carries the turpentine with it, yet in practice it is better to use some form of gaseous or vaporous carrier. Under the ordinary laws of evaporation, turpentine evaporates much more freely and at a lower temperature into a gas mass carrying little of its own vapors than into a gas mass containing much of such vapors, so that it is desirable to use a considerable volume of a gaseous or vaporous carrier circulating past the wood being distilled and absorbing and diluting the turpentine vapors as fast as formed. Air or neutral gases may be employed, the latter being better since air oxidizes turpentine and rosin, but steam is still better. I therefore preferably conduct the distillation by passing steam past or through the wood under treatment. The higher the temperature and pressure of the steam the quicker the distillation may be effected, but steam under 10—20 pounds pressure is perfectly suitable and is especially adapted to the present purposes while still lower pressures and the concomitant temperatures may be employed. With steam of low temperature, while the turpentine distills over well, the rosin is not damaged. At temperatures approaching or above the boiling point of turpentine, while the turpentine may be removed by the use of very little steam, yet the rosin is apt to be injuriously affected and to yield more or less rosin oil to contaminate the turpentine.

The wood is preferably finely comminuted, in the form of sawdust or small chips, such as, for example, those given by the "sawmill hog." It may be distilled in thin layers or strata, stationary or moving, but when steam is employed, the use of such thin layers or strata is not necessary and the comminuted wood may be in substantial masses of sawdust or chips and be contained in any suitable vessel. Preferably however, to save labor and expense, this vessel is the same as that subsequently employed for extraction. Using steam, low pressure steam is blown through or past the mass of wood to and through a condenser of any ordinary type wherein it condenses together with the turpentine vapors which it carries, the condensed water and turpentine being then gravitally separated. The passage of steam and the distillation are discontinued when the condensate no longer separates substantial quantities of turpentine. The distilled wood, thus freed of turpentine and containing the residual rosin in a substantially unchanged state, is next extracted with a volatile solvent capable of dissolving rosin. While the number of possible solvents which may be here employed is very large, almost any of the ordinary "volatile solvents," that is, any of the ordinary, low-boiling, chemically neutral solvents, such as grain or wood alcohol, petroleum hydrocarbons, like gasolene, benzin or naphtha, ether, methyl or ethyl acetate, benzol, acetone, etc., being all more or less adapted for this purpose, I prefer to use a special distillate from hard wood tar as free from disadvantages for this purpose inherent in most of the other common solvents. Petroleum hydrocarbons, for instance, while freely dissolving certain constituents of commercial rosin (from gum turpentine) do not dissolve other constituents so freely. Consequently in treating the wood with a limited quantity of gasolene, for instance, the solvent extracts more of certain resinous constituents of the wood than of other constituents, and the resinous matter regained on evaporating the extract is not the same as rosin from gum turpentine.

In destructively distilling hard woods, the condensate contains many and different substances, the aqueous portion or "pyroligneous acid" containing besides acetic acid, acetone, methyl alcohol and water a considerable portion of oily bodies held in solution and suspension by the influence of the solvent bodies named while the non-aqueous portion, or tar, contains a still larger amount of these oily bodies. In purifying the pyroligneous acid these oily bodies may be regained and the oily bodies may also be produced by direct distillation of the tar. Certain fractions of the oily bodies from either source may be employed in the present invention. Using hard wood tar, the tar is distilled in a suitable still till about half its weight passes over, the temperature of distillation being between 100° and 250° C. The first half of the distillate will consist of pyroligneous acid containing some wood spirit and of an oil lighter than water though containing some high-boiling heavy oils co-distilled therewith. The oil and acid are gravitally separated and the oil is next washed with water and with alkali to free it from acid and creosote and phenolic bodies and render it neutral. It is then redistilled in any suitable fractionating still to obtain the low boiling fractions, the fractions between 65° C. and 100° being particularly suitable for the present purposes though the fractions up to 170° C. may be employed. The distillate is of course neutral, the acids and phenolic bodies having been removed by the alkali. Any caustic alkali may be used, but soda or lime are suitable.

The oily bodies obtained in purifying pyroligneous acid by any of the ordinary methods are substantially the same as those obtained from wood tar and may be treated in the same manner as above indicated for the distillate from tar.

After steam distilling wood and before extracting with a solvent, the wood is preferably dried by any suitable method to permit good extraction since water-immiscible solvents do not well penetrate the damp fiber generally left by the treatment with low pressure steam while water-miscible solvents, such as alcohol, in taking up moisture lose much of their solvent power for rosin. Such drying is not absolutely necessary but it economizes in time and quantity of solvent employed. A convenient method is to follow the steam used in removing turpentine, etc., with a blast of air, supplying some heat at the same time, either by heating the air or the wood.

In the accompanying illustration I have shown, more or less diagrammatically, certain types of apparatus of the many adapted for use in the described process. In this showing, the figure represents, partly in central vertical section and partly in elevation, a simple type of apparatus (chosen for illustration because of its simplicity) in which the preliminary distillation and the subsequent extraction are performed in the same vessel, but one such vessel being shown. In practice, however, a plurality of similar vessels will generally be employed, connected in well understood ways to permit a methodical use of the same portion of solvent on a plurality of portions of distilled wood in the same manner as in diffusion batteries, thereby obtaining concentrated solutions and economy in the use of solvent. In this figure, 1 is the extraction and distillation vessel, provided with removable cover 2 secured by clamping means 3. At its base, the vessel is provided with door 4. Internally the vessel is provided with steam heating means, shown as steam pipes 5 placed near the sides. At their base, they communicate with steam trap 6. Steam is furnished by steam main 7 from boiler 8. Another connection 9 from the steam main furnishes steam to a series of perforated steam pipes 10 or other suitable means for introducing live steam within the vessel. Pipe 11 connected to fan 12 allows the introduction of an air blast at the bottom of the vessel. Near the top of the vessel is pipe 13 allowing the introduction of rosin solvent from storage tank 14 while above it is vapor main 15 passing to condenser 16 of an ordinary type. At its base, this condenser is provided with a valved return pipe 17, trapped at 18, to permit return of condensates to the extraction vessel. It is also provided with another valved outlet pipe, 19, shown as discharging into gutter or conduit 20 for water and turpentine. Communicating with the base of the extraction vessel is a valved extract pipe 21 leading to rosin still 22. This still is shown as steam heated, being provided with steam jacket 23, and has an outlet 24 for melted rosin. From the rosin still leads vapor pipe 25 to condenser 26 for the recovery of solvent. At its base, the condenser has discharge pipe 27 leading to tank 28 from which pump 29 withdraws condensed solvent and discharges it through pipe 30 to the storage tank for reuse.

In the operation of the apparatus shown and in performing the described process, the wood employed, which may be pine, light wood or any other form of coniferous wood, in a comminuted form, as sawdust, chips, "hogged wood," etc., is charged into the distillation and extraction vessel and is subjected to a blast of steam from pipes 10. Heating may be assisted by steam in coils 5. The steam, both that introduced and that formed from the moisture in the wood, passes outward through vapor main 15, carrying with it the volatilized turpentine. Water and turpentine are condensed in 16 and delivered through 19 into 20, 20 delivering the condensate to any suitable containing vessels (not shown). When no more substantial amount of turpentine is found in the condensate, the direct steam is turned off, the cover of the vessel removed and air blown through the wood to dry it and remove the steam and moisture. Drying may be hastened and facilitated by continuing the heating by steam coils 5 during the passage of the air. Hot air may be employed, but is hardly necessary since the coils furnish heat more conveniently. The first portions of air going through which will generally carry some steam and turpentine, may be sent to the condenser, but this is usually hardly worth while.

When the wood is sufficiently dry and free of steam, the introduction of air is discontinued and sufficient solvent to cover the wood is introduced through pipe 13 from storage tank 14. This solvent is preferably the neutral volatile hardwood tar distillate described, but it may be another neutral volatile solvent. In contact with the hot wood, the solvent is raised to the boiling temperature and it is preferably maintained at this temperature by the steam coils 5, extraction being better at high temperatures. Such solvent as volatilizes passes out through vapor main 15, is condensed in 16 and returns to the extractor through 17, the valve of pipe 19 being closed. After contact with the wood for a sufficient time, the charged solvent or rosin solution may be drawn off through 21 and sent to rosin still 22. Any rosin which, in the case of such resinous materials as "light wood," may have trickled down to the floor of the vessel during the steam distillation is dissolved by the solvent during the extraction and passes outward through 21 with the first portions of rosin solution. After withdrawal of the first portion of solvent, another portion of fresh solvent, or solvent which has been previously used elsewhere, may be introduced if desired.

When the extraction is completed, as many portions of solvent having been used as may be desired (and the portions may be used methodically in a plurality of vessels as stated, if so desired), the solvent remaining adhering to the wood is removed by passing in a little steam which volatilizes it, the vapors being allowed to pass through 15 into 16 and removed as liquid at 18, or following the liquid extract, to pass through 21 into 22, thence through 25, 26 and 27 into 28. Having removed the solvent, the lower door of the extraction vessel is opened and the exhausted wood dumped, leaving the vessel ready for another operation. The exhausted wood may be used for paper making or burned as fuel. The rosin solution in still 22 is distilled, the solvent being condensed and regained for future operations. The melted rosin remaining in the still is removed through 24.

The described low-boiling hardwood tar distillate is well adapted for extracting other valuable resins from wood as well as for extracting rosin.

By separately extracting the turpentine and resin in the manner described, the quality of each is improved. In extracting them together from the wood by solvents, as in the prior art, a mixture of solvent, turpentine and the resin, such as rosin, is obtained from which solvent and turpentine must be fractionated. As turpentine boils at a comparatively high temperature, in removing the last fractions of the turpentine from such a mixture there is apt to be some decomposition of the rosin, forming rosin oils which mix with the turpentine, injuring the quality of the rosin. And, in using the petroleum oils as solvents, the turpentine is apt to be contaminated with high-boiling impurities therefrom. The rosin itself is apt to be injured by the prolonged heating at high temperatures in removing the solvent and turpentine, darkening in color. And, as stated, when removed from the wood by hydrocarbons, it is apt to be different in composition from ordinary rosin. The described neutral tar distillate on the other hand gives a good quality of rosin.

While when employing the described low-boiling hardwood tar distillate as a solvent, both turpentine and resin can be simultaneously extracted, yet I regard it as preferable to extract them successively in the manner described, first distilling off the turpentine and then using the solvent.

The volatile solvents stated, like all those generally classed under that name, are neutral bodies; that is, chemically indifferent toward acid and alkali. This characteristic, and particularly the indifference toward acid, is valuable for the present purposes since alkaline-reacting bodies would tend to combine with the resin acids to form soapy bodies whence they could be removed only with difficulty.

What I claim is:—

1. The process of extracting turpentine and rosin from wood which comprises distilling off volatile bodies from a resinous wood at a temperature insufficient to injure the rosin, and subsequently extracting the wood with a neutral volatile solvent to remove rosin.

2. The process of recovering turpentine and rosin from wood which comprises distilling off turpentine from resinous Rood in a current of steam at a temperature below the boiling point of turpentine and subsequently extracting the wood with a neutral volatile solvent to remove rosin.

3. The process of recovering turpentine and rosin from wood which comprises distilling off turpentine from resinous wood in a current of steam at a temperature below the boiling point of turpentine, drying the wood to remove the steam and subsequently extracting the wood with a neutral volatile solvent to remove rosin.

4. The process of recovering valuable products from coniferous woods which comprises extracting such woods with a neutral low-boiling distillate from hardwood tar.

5. The process of recovering turpentine and rosin which comprises distilling off turpentine from a resinous wood in a current of low pressure steam and subsequently extracting rosin from the wood with a neutral low-boiling distillate from hardwood tar.

6. The process of recovering turpentine and rosin which comprises distilling off turpentine from a resinous wood in a current of low pressure steam, drying the wood to remove the steam and subsequently extracting the wood with a neutral low-boiling distillate from hardwood tar.

7. The process of recovering valuable products from wood which comprises placing such wood in a suitable container, distilling off volatile bodies from such wood in the presence of aqueous vapor at a low pressure and temperature, removing such vapor from container and wood, and extracting the wood remaining in such container with a neutral volatile solvent.

8. The process of recovering valuable products from resinous wood which comprises placing such wood in a suitable container, distilling off turpentine in the presence of aqueous vapor at a low pressure and temperature, removing such vapor from container and wood and extracting rosin from the wood remaining in the container with a neutral volatile solvent.

9. The process of recovering rosin from wood which comprises placing comminuted resinous wood in a suitable container, distilling off turpentine and volatile bodies in a current of steam at a temperature below the boiling point of turpentine, removing steam and moisture from the wood in said container, extracting the rosin from the treated wood with a neutral volatile solvent and recovering the rosin from the rosin solution so formed.

10. The process of recovering turpentine and rosin from wood, which comprises distilling off turpentine from resinous wood in a current of steam at a temperature below the boiling point of turpentine, the passage of said steam being continued until substantially no more volatile products are carried over thereby, and subsequently extracting the wood with a neutral volatile solvent to remove rosin.

In testimony whereof I affix my signature in the presence of two subscribing witnesses.

GEORGE WALKER.

Witnesses:
WILLIAM E. REILLY,
FRANCES FORESTER.

It is hereby certified that in Letters Patent No. 922,369, granted May 18, 1909, upon the application of George Walker, of New York, N. Y., for an improvement in "Processes of Extracting Resin and Turpentine," an error appears in the printed specification requiring correction, as follows: In line 26, page 4, the word "Rood" should read *wood;* and that the said Letters Patent should be read with this correction therein that the same may conform to the record of the case in the Patent Office.

Signed and sealed this 8th day of June, A. D., 1909.

[SEAL.]

C. C. BILLINGS,
*Acting Commissioner of Patents.*